United States Patent Office 2,700,045
Patented Jan. 18, 1955

2,700,045

2-(2'-IMIDAZOLINE-2'-THIOMETHYL)-5-HYDROXY-4-PYRONE, 2-(2'-IMIDAZOLINE-2'-THIOMETHYL)-5-ALKOXY-4-PYRONES AND SALTS THEREOF

Carl Peter Krimmel, Mundelein, Ill., assignor to G. D. Searle & Co., Chicago, Ill., a corporation of Illinois No Drawing. Application September 1, 1953, Serial No. 377,985

4 Claims. (Cl. 260—309.6)

The present invention relates to a new group of heterocyclic organic compounds which contain both a pyrone and an imidazoline ring. Specifically, it relates to the 2-(2'-imidazoline-2'-thiomethyl)-4-pyrones substituted in the 5-position by a hydroxy or a lower alkyloxy group and to their salts. The basic compounds can be represented by the general structural formula

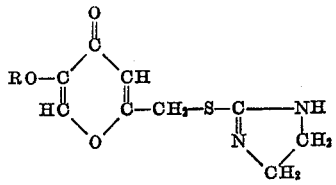

wherein R is hydrogen or a lower aliphatic type of radical. Among the lower alkyl radicals which R can represent are methyl, ethyl, straight and branched chain propyl, butyl, amyl and hexyl. Also within the scope of my invention are compounds in which R is benzyl and phenethyl. These compounds form salts which are nontoxic in therapeutic dosage with a variety of inorganic and strong organic acids.

The compounds of my invention are conveniently prepared as the hydrohalides by the condensation of a 5-hydroxy-2-halomethyl-4-pyrone or 5-alkyloxy-2-halomethyl-4-pyrone with one equivalent of ethylenethiourea in an organic solvent such as a lower alkanol. The free bases are liberated by treatment of the hydrohalide with alkaline agents.

It is the object of my invention to provide new chemical substances of the type indicated above. These compounds and their salts provide valuable medicinal substances. They are potent antibacterial agents. Further, they are cardiovascular agents particularly with respect to stimulation of the heart muscle.

The following examples illustrate in further detail the compounds which constitute this invention and the methods for their preparation but are in no way to be construed as limiting the invention in spirit or in scope.

Example 1

A mixture of 4 grams of 2-chloromethyl-5-hydroxy-4-pyrone, 2.6 grams of ethylenethiourea and 20 milliliters of ethanol is refluxed for 20 minutes. The resultant clear, yellow solution is cooled and seeded with a crystalline aggregate obtained by adding a drop of the reaction mixture to anhydrous ether and scratching the resultant gum.

Upon seeding, a heavy crystalline deposit is thrown down from the reaction mixture. It is filtered and washed with absolute ethanol. Upon recrystallization from absolute ethanol, the hydrochloride of 2-(2'-imidazoline-2'-thiomethyl)-5-hydroxy-4-pyrone is obtained as a cream-colored, water-soluble, crystalline powder which gives a deep red ferric chloride test and melts at about 190–192° C. with evolution of gas. It has the structural formula

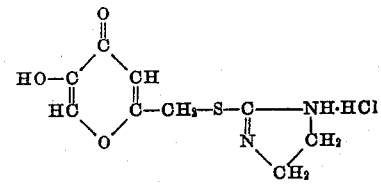

Example 2

A mixture of 3 grams of 2-chloromethyl-5-methoxy-4-pyrone and 1.9 grams of ethylenethiourea in 15 milliliters of absolute ethanol is refluxed for 20 minutes. Upon cooling, a copious deposit of granular cream-colored crystals is formed. In the event that a small initial deposit of ethylenethiourea appears, removal of this deposit by filtration allows the crystallization to proceed normally. Upon recrystallization from absolute ethanol and decolorizing carbon, the hydrochloride of 2-(2'-imidazoline-2'-thiomethyl)-5-methoxy-4-pyrone is obtained as a cream-colored, crystalline powder, giving a negative ferric chloride test. It melts at about 166–168° C. with evolution of gas.

I claim:

1. A compound of the structural formula

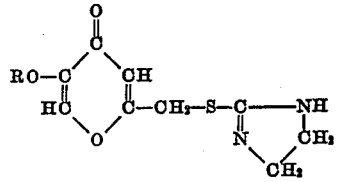

wherein R is a member of the class consisting of hydrogen and lower alkyl radicals.

2. A compound of the structural formula

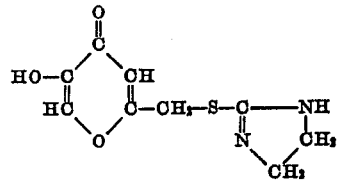

3. A compound of the structural formula

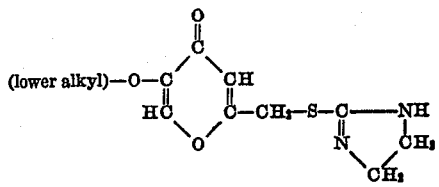

4. A compound of the structural formula

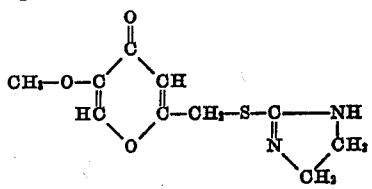

No references cited.